United States Patent [19]

Smith

[11] Patent Number: 4,853,999
[45] Date of Patent: Aug. 8, 1989

[54] TAIL BRIDGE

[76] Inventor: Edward Smith, 53 Belcher Rd., Blairstown, N.J. 07825

[21] Appl. No.: 161,917

[22] Filed: Feb. 29, 1988

Related U.S. Application Data

[63] Continuation-in-part of Ser. No. 9,916, Feb. 27, 1987, Pat. No. 4,727,612.

[30] Foreign Application Priority Data

Jan. 28, 1988 [MX] Mexico ................. 10242

[51] Int. Cl.⁴ .................. E01D 1/00
[52] U.S. Cl. ...................... 14/69.5
[58] Field of Search .............. 14/69.5; 16/5, 8; 24/67 R, 457; 414/537; 296/61

[56] References Cited

U.S. PATENT DOCUMENTS

| | | | |
|---|---|---|---|
| 472,612 | 3/1988 | Smith | 14/69.5 |
| 1,568,303 | 1/1926 | Webster | 14/69.5 |
| 2,594,425 | 4/1952 | Greenberg | 14/69.5 X |
| 3,984,891 | 10/1976 | Weinmann | 14/69.5 |
| 4,528,711 | 7/1985 | Packer | 14/69.5 |

Primary Examiner—Jerome W. Massie, IV
Assistant Examiner—Matthew Smith
Attorney, Agent, or Firm—Horst M. Kasper

[57] ABSTRACT

The invention provides a tail bridge for bridging a tail end of a motor vehicle and the ground with a ramp rail. A foot part for the tail bridge includes a lower section plate to be placed on ground, an upper section plate solidly jointed to the lower section plate to provide an about V-shape with the apex of the V away from the ramp rail, an upper extension plate joined to the other end of the upper section plate and forming therewith an angle of from about 30 to 70 degrees, and a lower extension plate joined to the other end of the lower section plate away from the apex of the V such that the upper and the lower extension plates are disposed about parallel to each other. Holes are provided in the upper and the lower extension plates for attaching a beam of lumber. A first plate structure to be placed on the motor vehicle tail end is joined along a straight line at one edge to a second plate structure making a angle of from 12 to 20 degrees with the first plate structure. An intermediate plate structure is attached at the joint of the first and second plate structures and runs downwardly.

20 Claims, 3 Drawing Sheets

TAIL BRIDGE

CROSS-REFERENCE TO RELATED APPLICATIONS

This application is a continuation-in-part application of another application filed Feb. 2, 1987 and bearing Ser. No. 07/009,916, U.S. Pat. No. 4,727,612. The entire disclosure of this latter application, including the drawings thereof, is hereby incorporated in this application as if fully set forth herein.

BACKGROUND OF THE INVENTION

1. Field of the Invention

The present invention relates to a tail bridge that provides a bridge between the tail part of a motor vehicle and a support rail.

2. Brief Description of the Background of the Invention Including Prior Art

U.S. Pat. No. 2,594,425 to Hymen Greenberg teaches a removable runway. The shape of a plate is taught, where sides are cut and bent to provide gripping fingers 52 similar to gripping fingers 24 and 26. This construction is intended to be a carpet edge so that it is possible to move for example beds or fold rollers over items.

U.S. Pat. No. 1,568,303 to W. E. Webster teaches a freight skid. The freight skid is formed by a plank having the upper face of its ends beveled and adapted to receive another plate, which preferably has a full width of the skid section. An overhung bend or bight in the plate is cut away to form hinge elements adapted to receive a hinge pin. This is quite a complicated construction for providing a freight skid.

U.S. Pat. No. 3,580,373 teaches a portable ramp. The portable ramp includes a transverse member that is detachably secured to the floor member at one end thereof and to a vehicle. A downwardly projecting portion or detent projects through a mating opening in a shoulder portion of a transverse member.

U.S. Pat. No. 749,595 to H. Van Doorn teaches a wharf drop. According to FIG. 5a of the reference, only a single worm shaft is employed, which extends from side to side of the wharf drop and is provided with a right and left-hand worm engaging the worm wheels ff, respectively.

All these references teach relatively complicated devices. Some of them relate to fields completely different from a tail bridge, such as, for example, carpet edges.

SUMMARY OF THE INVENTION

1. Purposes of the Invention

It is an object of the present invention to provide a simple device that allows the movement of material from ground level to the loading level of a motor vehicle.

It is another object of the present invention to provide a device that avoids a step during a loading and unloading process from a motor vehicle for items to be moved along a surface.

It is yet another object of the present invention to provide a structurally sound and stable means for performing loading and unloading operations from motor vehicles.

These and other objects and advantages of the present invention will become evident from the description which follows.

2. Brief Description of the Invention

According to the present invention, a tail bridge for bridging a tail end of a motor vehicle and the ground with a ramp rail is provided with a foot part. A lower section plate is to be placed on the ground for supporting the tail bridge. An upper section plate is solidly joined to the lower section plate to provide an about V-shape, with the apex of the V to be disposed remote relative to the ramp rail. An upper extension plate is joined to the end of the upper section plate remote from the apex of the V along a straight uninterrupted junction line and extending at an edge of the first plate and forming an angle of from about 30 to 70 degrees relative to the first plate. A lower extension plate is joined to the end of the lower section plate remote from the apex of the V such that the upper extension plate and the lower extension plate are about parallel with an angle of less than about 5 degrees between them. The middle plane between the upper extension plane and the lower extension plane forms an angle of less than about 20 degrees with the bisector of the V and such that a second end of the ramp rail can be placed between the upper and the lower extension plates. A hole is disposed in the upper extension plate. A hole is disposed in the lower extension plate such that a bolt can be placed jointly through the hole in the upper section plate and in the lower extension plate for solidly attaching the ramp rail to the lower extension plate and to the upper extension plate.

Ridges and grooves can be disposed on the lower section plate toward the ground running about parallel to the junction line between the lower section plate and the upper section plate for frictionally engaging the ground and the lower section plate. Ridges and grooves can be disposed on the upper section plate toward the ground running about parallel to the junction line between the lower section plate and the upper section plate for frictionally engaging a wheel of a transport vehicle. The lower section plate can be convex relative to the upper section plate. The upper section plate and the lower section plate can form an angle of from about 35 to 55 degrees at the apex of the V.

The ridges and grooves formed on the lower section plate can have a depth of from 0.2 to 0.5 of the thickness of the lower section plate.

The upper hole can have a bevelled upper edge for allowing to countersink a head of a bolt in the hole. The diameter of the hole can be from about one to two times the thickness of the respective plate extension.

The lower section plate can be curved such that the outwardly bulging side is disposed toward the ground and where the curvature increases toward the tip of the V. The lower section plate can be curved such that the outwardly bulging side is disposed toward the ground and where the integral angle over the curvature of the lower section plate is less than 1.5 times the angle between the upper section plate and the upper extension plate.

A ramp rail can comprise a first plate structure to be placed on the tail end of the motor vehicle for running substantially parallel to the tail edge of the motor vehicle tail end. A second plate structure can be rigidly joined to the first plate structure along a straight uninterrupted junction line and can extend at an edge of the first plate structure and form an angle of from about 12 to 20 degrees relative to the first plate structure. An intermediate section can be attached between the first and second plate structure substantially along the straight junction line and extending downwardly. A third plate structure can be attached to the lower end of the intermediate section and run substantially parallel to the second plate structure and can be spaced therefrom at a distance corresponding to the width of a rail to be placed between the second and third plate structure.

A bevel can be disposed at the upper edge of the open end of the first plate structure. The intermediate section can be disposed at an angle from about 85 to 95 degrees relative to the first plate structure. A bevel can be disposed at the upper edge of the free end of the second plate structure. A bevel, disposed at the lower end of the open end of the third plate structure, can extend over nearly the full width of the third plate structure and the bevel angle can be from about 20 to 40 degrees.

The thickness of the first plate structure can be tapered and reduced by from about 40 to 60 percent between the area near the junction of the first plate structure and the second plate structure and the free end. The third plate structure can be tapered and reduced in thickness by from about 20 to 30 percent when moving from an end near the intermediate section to the free end of the third plate structure. Traction lines can be disposed on top of the first plate structure and on top of the second plate structure. These traction lines can run substantially in parallel to the junction between the first and second plate structure. Holes having a diameter of from about 0.6 cm to about 1.3 cm can be displaced near the two free corners of the first plate structure.

Holes having a diameter of from about 0.6 cm to 2.5 cm can be disposed on the second plate structure and on the third plate structure. Preferably, these holes are aligned in a vertical direction toward the second and third plate structure extension.

Preferably, the device is comprised throughout of an extruded metal. The extruded metal can be an aluminum alloy.

A tail bridge for bridging a tail end of a motor vehicle and the ground with a ramp rail comprises a first plate structure to be placed on the tail end of the motor vehicle. A second plate structure is joined to the first plate structure and extends at an edge of the first plate structure running about parallel to a tail edge of the motor vehicle tail end and forming an angle of from about 12 to 20 degrees relative to the first plate structure. An intermediate section is attached between the first and second plate structure and running downwardly. A third plate structure is attached to the lower end of the intermediate section and runs substantially parallel to the second plate structure at a distance corresponding to the width of a rail to be placed between the second and third plate structure.

The first plate structure can have an extension of from about 10 to 15 cm, and the second plate structure and the third plate structure can have an extension of from about 7.5 to 12.5 cm. The width of the plates can be from about 12 to 38 cm. The first plate structure can have a thickness of from about 0.35 cm to 1.3 cm, the second plate structure can have a thickness of from about 0.5 to 1 cm, and the third plate structure can have a thickness of from about 0.35 to 0.75 cm. The intermediate section can have a thickness of from about 0.5 to 1 cm. Preferably, fillets are provided between the first plate structure, the second plate structure, and the intermediate plate structure. The radius of the fillet can be from about 0.5 to 1.5 the thickness of the intermediate section. The yield strength for 0.2 percent offset can be at least 700 kg/sq.cm, the tensile strength of the alloy employed can be at least 1,400 kg/sq.cm, the Brinell hardness of the alloy can be at least 40, and the rated stability of the device can be at least 150 kg maximum for each device.

The first plate structure can be formed from an upper plate and a lower plate running about parallel. These plates can be joined on the side away from the intermediate section along an edge such as produced by a bending process. The intermediate section can be joined to the lower plate and the second plate structure can be joined to the upper plate.

Preferably, the first plate structure has an overall thickness which is less than four times the thickness of the second plate. Holes having a diameter of from about 0.6 cm to about 1.3 cm can be displaced near the two free corners of the first plate structure such that the holes in the upper plate can be aligned with the axis of the holes in the lower plate. The device can be comprised throughout of an extruded metal.

For bridging a tail end of a motor vehicle and the ground with a ramp rail, a first plate structure is to be placed on the tail end of the motor vehicle. An intermediate section is to be attached at an end of the first plate structure and runs downwardly. The intermediate plate structure is formed with structural waves running parallel to the junction direction of the intermediate plate and having a wavelength of from about one fifth to one half of the length of the junction between intermediate plate and first plate. A third plate structure is to be attached to the lower end of the intermediate section and runs about parallel to a tail edge of the motor vehicle tail end and forms an angle of from about 12 to 20 degrees relative to the first plate structure with a rail to be placed on top of the third plate structure. A retainer piece is to be placed on the top of a rail opposite to the third plate to be connected to the third plate for providing a solid attachment of the rail to the third plate.

The structural waves can run in the longitudinal direction of the rail and can have a wavelength of from about one quarter to one half of the length of the rail. The structural waves can be limited in their extension to the center region extending over a length of less than 0.75 times the length of the rail.

The novel features which are considered as characteristic for the invention are set forth in the appended claims. The invention itself, however, both as to its construction and its method of operation, together with additional objects and advantages thereof, will be best understood from the following description of specific embodiments when read in connection with the accompanying drawing.

BRIEF DESCRIPTION OF THE DRAWING

In the accompanying drawing, in which are shown several of the various possible embodiments of the present invention.

DESCRIPTION OF INVENTION AND PREFERRED EMBODIMENTS

Figure 1:
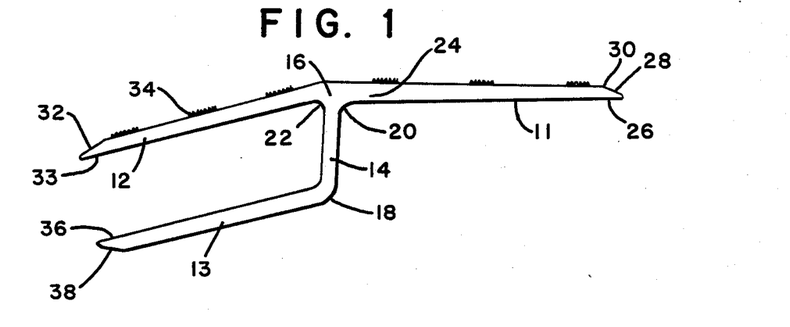
FIG. 1 is a sectional view of the tail bridge.

In accordance with the present invention, there is provided a tail bridge comprising four plates, where the first plate 11 is to be disposed on and supported by a tail section of a motor vehicle. A second plate 12 joins the first plate at its end along a straight line 16. An intermediate plate 14 is attached to the joint of the first and second plate in a downward direction. A third plate 13 is attached to the end 18 of the intermediate plate 14. The first plate, the second plate and the intermediate plate form a strong joint at 16. The strength of the joint 16 is increased by fillets 20, 22 disposed between the first plate and the intermediate plate and between the second plate and the intermediate plate. These fillets 20, 22 can have a fillet radius of from about 0.5 to 2 times the thickness of the intermediate plate 14.

The first plate 11 is conceptually positioned in a horizontal direction. Preferably, the width of the first plate 11 is larger at the end 24 where it joins the second plate 12 as compared to its free end 26. The amount of thickness reduction between the end 24 adjoining the junction to the second plate 12 and the free end 26 can be from about 30 to 60 percent. The end section is preferably provided with a bevel 28.

The length of the first plate 11 can be from about 3 to 8 inches and preferably is between 4 and 6 inches, such as for example, about 5 inches. The free end 26 of the first plate 11 is preferably provided with a bevel 28. The bevel 28 is provided at the upper end corner 30 and preferably can cover nearly the full thickness width of the end part of the first plate. The bevel angle can be from about 20 to 45 degrees and is preferably about 25 to 35 degrees as measured relative to a plane parallel to the first plate. Furthermore, the edge at the end of the first plate 11, as well as the corresponding edges of the second and third plate to be mentioned later, are preferably provided such that these are not sharp edges but have a radius of curvature of at least ⅛ inch.

The second plate 12 is disposed versus the first plate 11 at an angle of from about 12 to 20 degrees and preferably at an angle of from about 14 to 16 degrees, such as, for example, an angle of 15 degrees. The second plate 12 is generally shorter than the first plate 11 and is preferably from about 10 to 30 percent shorter than the first plate 11. The thickness of the second plate 12 is preferably substantially uniform, that is, uniform with variations of up to 10 percent between one end and the other. The second plate 12 is again preferably provided with a bevel 32 on its upper edge 33, which can be at an angle of from 20 to 45 degrees and preferably from about 25 to 35 degrees relative to a plane parallel to the plate.

Figure 2:
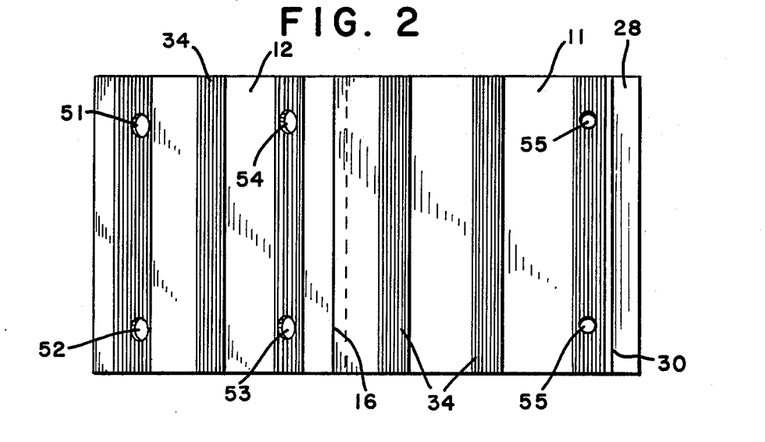
FIG. 2 is a top view of the tail bridge.

The tops of the first plate 11 and of the second plate 12 are preferably provided with friction-generating elements 34, such as linear protrusions running parallel to the junction of the first and second plate, which allow, for example, tires to get a better grip on the tail bridge. Preferably, the surface of the first and second section is each subdivided such that each such section comprises from about 2 to 5 gripping sections with flat sections in between, where the gripping sections have a width of from about 0.8 to 1.2 times the width of the flat sections. The protrusions are preferably less than from about 1 to 10 percent of the thickness of the plates. The general shape of the cross-section of the protrusions can be from about square to semicircular.

The intermediate plate 14 generally extends in an angular direction, that is between a perpendicular plane relative to the first plate 11 and a perpendicular plane relative to the second plate 12. More preferably, the intermediate plate 14 is in the above range within that half of the angle range that is adjacent to a perpendicular plane standing perpendicular to the first plate. The length of the intermediate plate 14 is such that a distance sufficient to support and hold a ramp rail is generated between the second plate 12 and the third plate 13.

The length of the third plate 13 can be from about 0.8 to 1.2 times the length of the second plate 12 and is preferably from 0.9 to 1 times the length of the second plate. The free end 36 of the third plate is preferably provided with a bevel 38, where the bevel surface forms an angle of from 20 to 45 degrees with the plane of the third plate.

It is important that the second and third plate are constructed such that a good fit is provided to the ramp rail surfaces. Upon load, the ramp rail is preferably supported on the ground at its one end. Such fixture then results in a compression between the rail and the tail bridge against the area of the intermediate plate under load.

Figure 3:
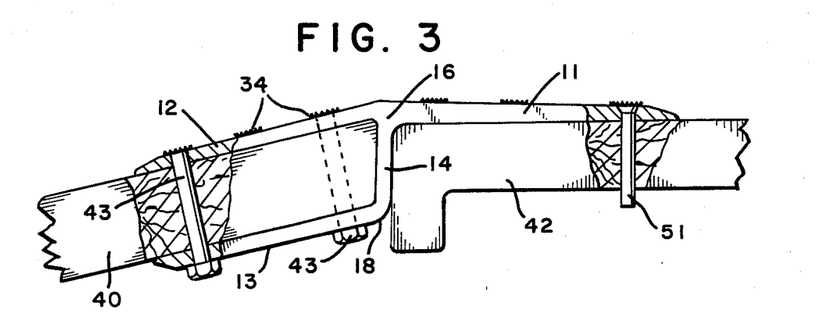
FIG. 3 is a sectional view of the tail bridge assembled to a wooden rail and positioned on a tailgate of a motor vehicle.

In addition, preferably the support rail 40 is bolted to the second and third plates, as is illustrated in FIG. 3. It is necessary that the surfaces of the rail are essentially flush against the surfaces of the second and third plates so as to achieve a strong connection between tail bridge and rail. Furthermore, bolt holes 51–54 are to be provided in the second plate 12 and the third plate 13 which are aligned perpendicularly to the extension of these plates such that bolts 43 can be employed and tightened to hold a rail in place between the second and third plate. The bore holes can have diameters from about ¼ inch to about 1 inch and preferably have diameters of ⅜ to ⅝ inch. In general, these bore holes are shown in the drawing designated as 51, 52, 53, and 54. The second rail can have a thickness of from about 0.15 inch to 0.3 inch and the thickness is preferably about 0.25 inch.

On the right-hand side of FIG. 3 there is illustrated a temporary means 51 for securing the ramp bridge to the tail end of a motor vehicle. Such temporary means may be constructed in such way as to make use of such temporary means optional and to avoid a need of employing such temporary means each time the ramp bridges are used.

The intermediate plate 14 can have a thickness of from about 0.15 to 0.4 inches and is preferably between 0.2 and 0.3 inches, such as near 0.25 inches. The third plate 13 adjoins the intermediate plate 14 and has a length of from about 0.7 to 1 times the length of the first plate 11. Preferably the end 18 of the third plate 13 and the end 16 of the second plate are vertically aligned relative the surfaces of the second plate 12 and the third plate 13. The third plate is provided with a bevel at its lower end that can be disposed at an angle of from about 20 to 45 degrees and preferably at an angle of from about 25 to 35 degrees relative to the third plate plane. The width of the bevel can be about 1/5 to 1/10 of the length of the third plate and is preferably from about 0.4 to 0.6 inches.

Furthermore, the first plate 11 is preferably provided with holes 55 that can have a diameter of from ¼ to ½ inch and that can provide an attachment means for attaching and securing the first plate 11 on the tail end 42 of a load platform of a motor vehicle.

The device of the present invention is preferably produced as an integral piece by metal extrusion. Preferred metals employed include alloys of aluminum such as alloy 6061-T6. Other materials useful for producing the invention device include formed metals such as formed steel. The steel employed can be in the form of a T beam, where one upper arm of the T is bent off at an angle of from about 12 to 18 degrees and where the lower part of the T is bent off and formed to provide the intermediate plate and the third plate. Alternatively, the tail bridge could be welded together by employing various welding processes for T joints or corner joints. Usable weld types include bead, groove, fillet and weave.

The overall dimensions of the device are preferably less than 30 inches and more preferably less than about 10 inches, and these dimensions can be those dimensions running in the directions of a three-dimensional coordinate system. The width of the device can be from about 5 to 20 inches and preferably is between 6 and 10 inches, such as, for example, about 8 inches. This width is appropriate for matching dimensional lumber pieces such as material stock of nominal 2×10. The distance between the second plate and the third plate also is to be set such that it closely matches the thickness dimensions of dimensional lumber pieces. For example, a thickness of 1.5 inches is appropriate for nominal 2-inch lumber material.

The present invention provides the advantage that the tail bridge is suitable for moving heavy equipment with ease onto a loading platform of a motor vehicle. In view of the compression forces resulting upon loading a ramp and the tail bridge, substantial stability is provided and rated weights of 300 pounds and more can be obtained. The tail bridge provides a relatively smooth but nevertheless friction-providing support for wheels that have to be transported onto a loading level of a motor vehicle or of a trailer. The bolt attachment that can be provided on both the vehicular end side and on the side with ramp rail ensures a secure support for the materials to be moved onto the loading level.

The invention device has further applications in providing a scaffolding support for masons such that a staging on an upper level can be achieved and wheelbarrows can be moved upward from level to level. In particular, bumps are avoided and a secure attachment is present.

A further application of the tail bridge can be for temporary installation of ramps for wheelchairs, which ramps can be disposed on top of stairways. The first plate can be easily installed at the top of a stairway, and the two ramp rails would still allow intermediate space for a person to mount the stairs as they originally existed while, at the same time, allowing a wheelchair to be moved upward. Of course, the relative angles between the first plate 11 and the second plate 12 would be adjusted to the rise angle of the stairway, such as, for example, from about 35 to 50 degrees. Also the dimensions of the plates could be adapted to the specific stair parameters.

Figure 6:
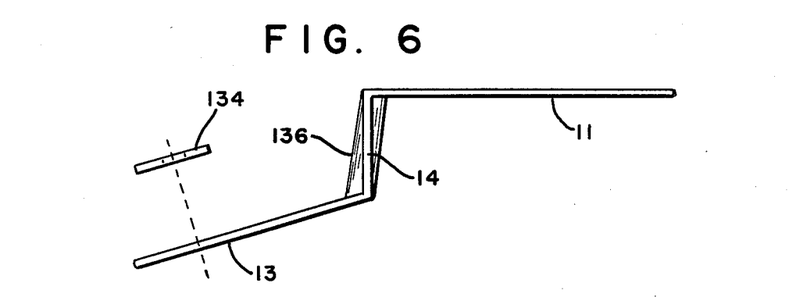
FIG. 6 is a side elevational view of a tail bridge strengthened with structural waves.
Figure 7:
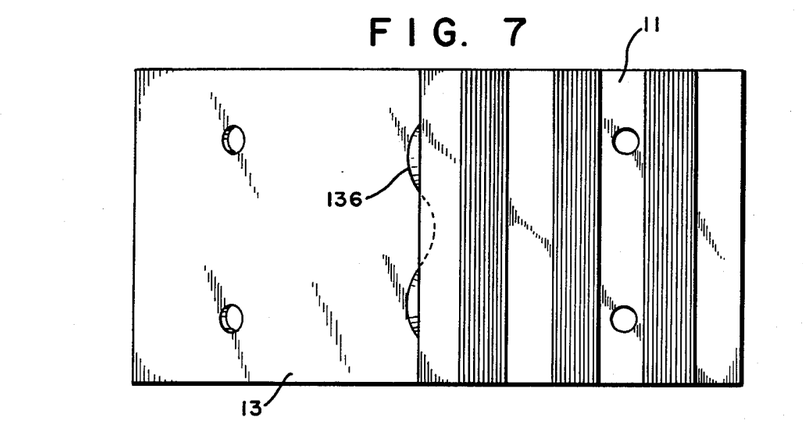
FIG. 7 is a top plan view of the tail bridge according to FIG. 6.

As illustrated in FIG. 6, the tail bridge can also be formed from a piece having only the first plate 11, the intermediate plate 14, and the third plate 13 together with a retainer piece 134. The retainer piece can be a washerlike plate having a round or preferably rectangular shape. The retainer piece can be provided with friction elements such as those provided to lock washers which prevent a turning of the retainer piece when placed in position. The diameter of the retainer piece can be from about one fifth to one third of the length of the third plate.

If such a construction is employed then it is important that the intermediate plate provides a connection between the first and the third plate which is sufficiently strong against bending of the first plate versus the third plate. This strength can be imparted by providing the intermediate plate in a corrugated fashion where, in a direction parallel to the junction, a wave is running. This wave provides that the edges between the first plate and the intermediate plate and, respectively, between the third plate and the intermediate plate, run along a preferably sinusoidally curved line, as seen from the top. The height of the sinusoidal wave from top extremum to bottom extremum of the wave can be from about one fifth to one thirtieth of the length of the first plate and is preferably from about one eighth to one twentieth of the length of the first plate. The wavelength of the wave can be from about one fifth to one half of the length of the rail. Preferably, the wave 136 is limited to the inner centered three quarters of the length of the rail. The form of the holes of the embodiment of FIG. 6 can correspond to that of the holes in FIG. 1.

While the wave form provides a relatively simple and strong form for increasing support against bending of the first and third plates relative to each other, other constructions are also possible. For example the waves can be modified from a wave with parallel running crests to wave sections pieced together, where the crests run at a defined angle with respect to each other and are staggered for the connection of the intermediate plate to the first plate 11 and to the third plate 13.

Figure 8:
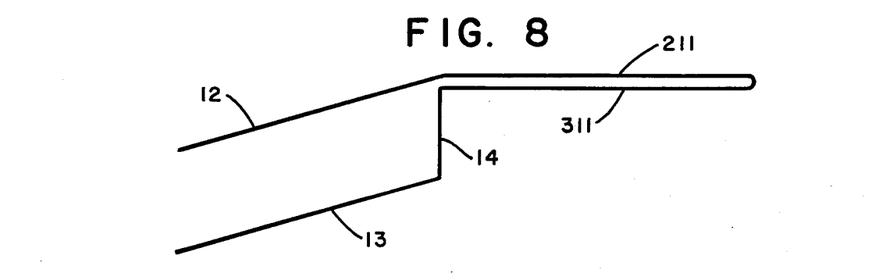
FIG. 8 is a side elevational view of a tail bridge employing a two-layer first plate structure.
Figure 9:
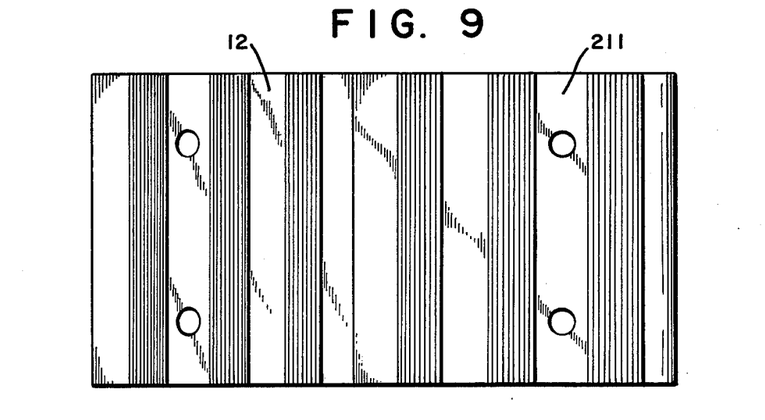
FIG. 9 is a top plan view of the tail bridge according to FIG. 8.

FIGS. 8 and 9 illustrate an embodiment where the first plate structure is composed of two parallel plates with an upper plate 211 and a lower plate 311 which plates are joined at the end remote from the second plate to each other such as obtained by a bending step or by a joining step. The intermediate plate in this case is joined only to the lower first plate 311 and the second plate is joined in this case only to the upper first plate 211. The overall structure of the embodiment of FIGS. 8 and 9 corresponds substantially to that of the embodiment given in FIGS. 1 to 3. The length of the third plate can be about equal within five percent to that of the second plate.

Figure 4:
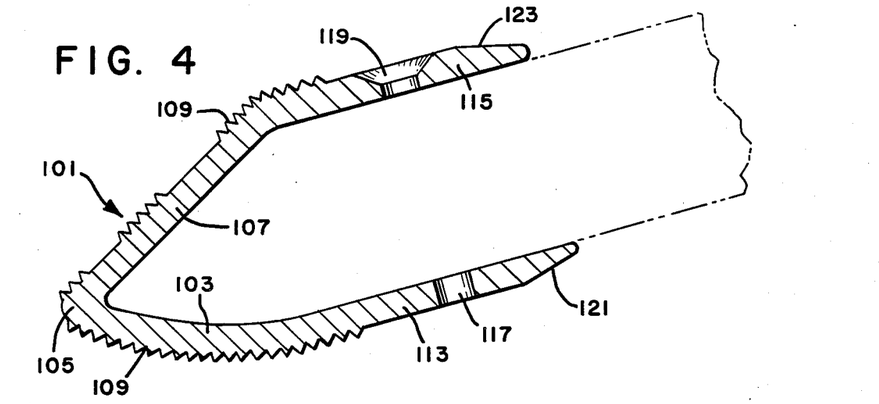
FIG. 4 is a sectional view of a foot part of a tail bridge.
Figure 5:
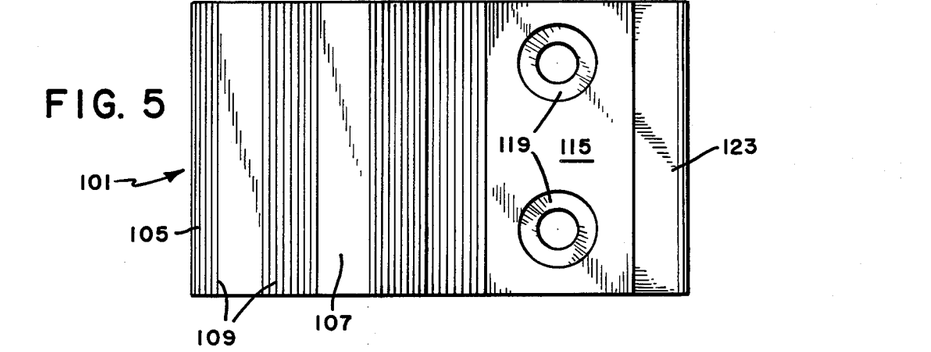
FIG. 5 is a top view of a foot part of a tail bridge.

According to the invention, there is also provided a foot part for the tail bridge. The foot part comprises an overall V-shaped section plate 101 which expands on the inside to about the width of the piece of lumber to be inserted. The lower section plate 103 of this expansion is preferably a rounded section. The angle of the tip 105 can be from about 30 to 70 degrees and is preferably between about 35 and 55 degrees. The radius of curvature of the rounded section plate 103 can be from about 2 to 5 times the thickness of the lumber piece used and the radius of curvature is preferably from about 2.5 to 4 times the thickness of the lumber piece used. Each arm 103, 107 of the about V-shaped section plate is extended by a straight section plate. Preferably, the straight section plates are about parallel to each other and their plane forms an angle of less than 20 degrees and preferably of less than 5 degrees with the bisector of the angle of the V. The length of the two straight section plates 113, 115 adjoining the respective V-shaped section plates 103, 107 can be from about 0.5 to 2 times the length of the V-shaped section plates (FIG. 4). Preferably, within the center third of the two straight extended section plates, a hole 117, 119 is provided for a countersunk screw, both on the upper part 115 and on the lower part 113 of the straight extension plate. The diameter of the holes 117, 119 can be from about one to two times the thickness of the plate. The rounded section is preferably provided with grooves and ridges on the outside of the V-shaped section plates which allow a solid footing of this piece on the ground. The grooves 109 are preferably disposed running in parallel to the intersection line of the V-shaped section plates. There can be from about 10 to 50, and preferably from about 20 to 30, about uniformly spaced grooves and ridges on the curved section plate 103 for providing stability of the support. The grooves 119 can further be located on the upper section plate 107 for providing frictional support to the wheels of a carriage. The grooves and ridges on the straight upper section plate can be grouped as from about 5 to 10 and can have an intermediate space between the groups, which extends in transport direction to 0.5 to 2 times the width of a group of grooves and ridges. The depth of the grooves can be from about 0.5 to 1 times the separation distance of neighboring grooves. The size of the grooves can be from about 0.5 to 0.3 of the thickness of the base material, and is preferably from about 0.1 to 0.2 of the thickness of the base material. The thickness of the plate for clamping the lumber beam can be from about 0.1 to 0.2 of the thickness of the beam to be held and is preferably from about 0.15 to 0.18 of the thickness of the beam.

The length of the curved section and of the straight section joining at an angle can be from about 1.1 to 1.5, and is preferably from about 1.2 to 1.4, of the thickness of the lumber beam to be held. The width of the foot section corresponds to that of the lumber beam and of the head part of the tail bridge. It is preferably from about 15 to 25 cm.

A bevel section 121, 123 can be provided at the outside ends of the straight extension plates and can extend over 0.2 to 0.4, and preferably over 0.25 to 0.3, of the extension of the straight extension plates in transport direction. The bevel angle can be from about 10 to 30 degrees relative to the transport direction.

Preferred materials for these elements include aluminum, in particular extruded aluminum, stainless steel, steel, and plastic materials having a high strength and toughness.

It will be understood that each of the elements described above, or two or more together, may also find a useful application in other types of support system configurations differing from the types described above. While the invention has been illustrated and described as embodied in the context of a tail bridge, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

1. A tail bridge for bridging a tail end of a motor vehicle and the ground with a ramp rail comprising a foot part for the tail bridge including
   a lower section plate to be placed on the ground for supporting the tail bridge;
   an upper section plate solidly joined to the lower section plate to provide an about V-shape, with the apex of the V to be disposed remote relative to the ramp rail;
   an upper extension plate joined to the end of the upper section plate remote from the apex of the V along a straight uninterrupted junction line and extending at an edge of a first plate and forming an angle of from about 30 to 70 degrees relative to the first plate;
   a lower extension plate joined to the end of the lower section plate remote from the apex of the V such that the upper extension plate and the lower extension plate are about parallel with an angle of less than about 5 degrees between them and where the middle plane between the upper extension plane and the lower extension plane forms an angle of less than about 20 degrees with the bisector of the V and such that a second end of the ramp rail can be placed between the upper and the lower extension plates;
   a hole in the upper extension plate;
   a hole in the lower extension plate such that a bolt can be placed jointly through the hole in the upper section plate and in the lower extension plate for solidly attaching the ramp rail to the lower extension plate and to the upper extension plate.

2. The tail bridge for bridging a tail end of a motor vehicle and the ground with a ramp rail according to claim 1 further comprising
   ridges and grooves disposed on the lower section plate toward the ground running about parallel to the junction line between the lower section plate and the upper section plate for frictionally engaging the ground and the lower section plate;
   ridges and grooves disposed on the upper section plate toward the ground running about parallel to the junction line between the lower section plate and the upper section plate for frictionally engaging a wheel of a transport vehicle;
   wherein the lower section plate is convex relative to the upper section plate; and
   wherein the upper section plate and the lower section plate form an angle of from about 35 to 55 degrees at the apex of the V.

3. The tail bridge for bridging a tail end of a motor vehicle and the ground with a ramp rail according to claim 2 wherein the ridges and grooves formed on the lower section plate have a depth of from 0.2 to 0.5 of the thickness of the lower section plate.

4. The tail bridge for bridging a tail end of a motor vehicle and the ground with a ramp rail according to claim 1 wherein the upper hole has a bevelled upper edge for allowing to countersink a head of a bolt in the hole.

5. The tail bridge for bridging a tail end of a motor vehicle and the ground with a ramp rail according to claim 1 wherein the diameter of the hole is from about one to two times the thickness of the respective plate extension.

6. The tail bridge for bridging a tail end of a motor vehicle and the ground with a ramp rail according to claim 1 wherein the lower section plate is curved such that the outwardly bulging side is disposed toward the ground and where the curvature increases toward the tip of the V.

7. The tail bridge for bridging a tail end of a motor vehicle and the ground with a ramp rail according to claim 1 wherein the lower section plate is curved such that the outwardly bulging side is disposed toward the ground and where the integral angle over the curvature of the lower section plate is less than 1.5 times the angle between the upper section plate and the upper extension plate.

8. The tail bridge for bridging a tail end of a motor vehicle and the ground with a ramp rail according to claim 1 further comprising a ramp rail including
   a first plate structure to be placed on the tail end of the motor vehicle for running substantially parallel to the tail edge of the motor vehicle tail end;
   a second plate structure rigidly joined to the first plate structure along a straight uninterrupted junction line and extending at an edge of the first plate structure and forming an angle of from about 12 to 20 degrees relative to the first plate structure;
   an intermediate section attached between the first and second plate structure substantially along the straight junction line and extending downwardly;
   a third plate structure attached to the lower end of the intermediate section and running substantially parallel to the second plate structure and spaced therefrom a distance corresponding to the width of a rail to be placed between the second and third plate structure.

9. The tail bridge for bridging a tail end of a motor vehicle and the ground with a ramp rail according to claim 8, further comprising
   a bevel at the upper edge of the open end of the first plate structure; and
   wherein the intermediate section is disposed at an angle from about 85 to 95 degrees relative to the first plate structure.

10. The tail bridge for bridging a tail end of a motor vehicle and the ground with a ramp rail according to claim 8 further comprising
    a bevel disposed at the upper edge of the free end of the second plate structure;
    a bevel disposed at the lower end of the open end of the third plate structure, where the bevel extends over nearly the full width of the third plate structure and where the bevel angle is about 20 to 40 degrees.

11. The tail bridge for bridging a tail end of a motor vehicle and the ground with a ramp rail according to claim 8 wherein the thickness of the first plate structure is tapered and being reduced by from about 40 to 60 percent between the area near the junction of the first plate structure and the second plate structure and the free end; wherein the third plate structure is tapered and being reduced in thickness from by about 20 to 30 percent when moving from an end near the intermediate section to the free end of the third plate structure; and further comprising
    traction lines on top of the first plate structure and on top of the second plate structure, which traction lines run substantially in parallel to the junction between the first and second plate structure;
    holes having a diameter of from about 0.6 cm to about 1.3 cm displaced near the two free corners of the first plate structure.

12. The tail bridge for bridging a tail end of a motor vehicle and the ground with a ramp rail according to claim 8 further comprising
    holes having a diameter of from about 0.6 cm to 2.5 cm disposed on the second plate structure and on the third plate structure, which are aligned in a vertical direction toward the second and third plate structure extension.

13. The tail bridge for bridging a tail end of a motor vehicle and the ground with a ramp rail according to claim 1 where the device is comprised throughout of an extruded metal.

14. The tail bridge for bridging a tail end of a motor vehicle and the ground with a ramp rail according to claim 13 wherein the extruded metal is an aluminum alloy.

15. A tail bridge for bridging a tail end of a motor vehicle and the ground with a ramp rail comprising
    a first plate structure to be placed on the tail end of the motor vehicle;
    a second plate structure joined to the first plate structure and extending at an edge of the first plate structure running about parallel to a tail edge of the motor vehicle tail end and forming an angle of from about 12 to 20 degrees relative to the first plate structure; an intermediate section attached between the first and second plate structure and running downwardly;
    a third plate structure attached to the lower end of the intermediate section and running substantially parallel to the second plate structure at a distance corresponding to the width of a rail to be placed between the second and third plate structure; and a foot part of the tail bridge including a lower section plate and an upper section plate.

16. The tail bridge for bridging a tail end of a motor vehicle and the ground with a ramp rail according to claim 15 wherein
    the first plate structure has an extension of from about 10 to 15 cm and where the second plate structure and the third plate structure have an extension of from about 7.5 to 12.5 cm;
    wherein the width of the plates is from about 12 to 38 cm and wherein the first plate structure has a thickness of from about 0.35 cm to 1.3 cm, wherein the second plate structure has a thickness of from about 0.5 to 1 cm, wherein the third plate structure has a thickness of from about 0.35 to 0.75 cm, wherein the intermediate section has a thickness of from about 0.5 to 1 cm, and wherein fillets are provided between the first plate structure, the second plate structure, and the intermediate plate structure and where the radius of the fillet is from about 0.5 to 1.5 the thickness of the intermediate section;
    wherein the yield strength for 0.2 percent offset is at least 700 kg/sq.cm, wherein the tensile strength of the alloy employed is at least 1,400 kg/sq.cm, wherein the Brinell hardness of the alloy is at least 40, and wherein the rated stability of the device is at least 150 kg maximum for each device.

17. The tail bridge for bridging a tail end of a motor vehicle and the ground with a ramp rail according to claim 15 wherein
    the first plate structure is formed from an upper plate and a lower plate running about parallel, which plates are joined on the side away from the intermediate section along an edge such as produced by a bending process and where the intermediate section is joined to the lower plate and where the second plate structure is joined to the upper plate.

18. The tail bridge for bridging a tail end of a motor vehicle and the ground with a ramp rail according to claim 17 wherein
the first plate structure has an overall thickness which is less than four times the thickness of the second plate; holes having a diameter of from about 0.6 cm to about 1.3 cm displaced near the two free corners of the first plate structure such that the holes in the upper plate are aligned with the axis of the holes in the lower plate; and
wherein the device is comprised throughout of an extruded metal.

19. A tail bridge for bridging a tail end of a motor vehicle and the ground with a ramp rail comprising a first plate structure to be placed on the tail end of the motor vehicle;
an intermediate section attached at an end of the first plate structure and running downwardly and wherein the intermediate plate structure is formed with structural waves running parallel to the junction direction of the intermediate plate and having a wavelength of from about one fifth to one half of the length of the junction between intermediate plate and first plate;
a third plate structure attached to the lower end of the intermediate section and running about parallel to a tail edge of the motor vehicle tail end and forming an angle of from about 12 to 20 degrees relative to the first plate structure with a rail to be placed on top of the third plate structure; and
a retainer piece to be placed on the top of a rail opposite to the third plate to be connected to the third plate for providing a solid attachment of the rail to the third plate.

20. The tail bridge for bridging a tail end of a motor vehicle and the ground with a ramp rail according to claim 19 wherein
the structural waves running in the longitudinal direction of the rail and having a wavelength of from about one quarter to one half of the length of the rail and which structural waves are limited in their extension to the center region extending over a length of less than 0.75 times the length of the rail.

* * * * *